United States Patent
Kim et al.

(10) Patent No.: US 9,460,113 B2
(45) Date of Patent: Oct. 4, 2016

(54) SYSTEM AND METHOD FOR RECOMMENDING LOCATION-BASED KEYWORD

(75) Inventors: Byoung Hak Kim, Seongnam-si (KR); Chae Hyun Lee, Seongnam-si (KR)

(73) Assignee: NHN Corporation, Seongsam-si (KR)

( * ) Notice: Subject to any disclaimer, the term of this patent is extended or adjusted under 35 U.S.C. 154(b) by 344 days.

(21) Appl. No.: 13/243,684

(22) Filed: Sep. 23, 2011

(65) Prior Publication Data

US 2012/0102034 A1    Apr. 26, 2012

(30) Foreign Application Priority Data

Oct. 25, 2010   (KR) .......................... 10-2010-0103946

(51) Int. Cl.
*G06F 17/30* (2006.01)

(52) U.S. Cl.
CPC .............................. *G06F 17/30241* (2013.01)

(58) Field of Classification Search
CPC .................. G06F 17/3064; G06F 17/3097
USPC ............................................... 707/737
See application file for complete search history.

(56) References Cited

U.S. PATENT DOCUMENTS

| | | | |
|---|---|---|---|
| 7,519,618 B2* | 4/2009 | Nagahashi et al. | |
| 2001/0050732 A1* | 12/2001 | Okamoto et al. | 349/58 |
| 2007/0273558 A1* | 11/2007 | Smith et al. | 340/995.1 |
| 2008/0005251 A1* | 1/2008 | Im et al. | 709/206 |
| 2010/0257163 A1* | 10/2010 | Ohazama et al. | 707/724 |
| 2011/0010324 A1* | 1/2011 | Bolivar et al. | 706/46 |
| 2011/0191364 A1* | 8/2011 | LeBeau et al. | 707/767 |

FOREIGN PATENT DOCUMENTS

| | | |
|---|---|---|
| JP | 06-251084 | 9/1994 |
| KR | 100885527 | 2/2009 |
| KR | 1020090020937 | 2/2009 |

* cited by examiner

*Primary Examiner* — William Spieler
(74) *Attorney, Agent, or Firm* — Harness, Dickey & Pierce, P.L.C

(57) ABSTRACT

According to exemplary embodiments of the invention, a location-based keyword recommending system and method are provided. The location-based keyword recommending system may include a keyword collecting unit to store location information regarding a location where a keyword is input, a region setting unit to set a virtual region by performing clustering of the location information with reference to the keyword, a region combining unit to combine virtual regions overlapping each other into one virtual region, and a keyword recommending unit to provide a location-based keyword based on the keyword related to the location information of the virtual region.

31 Claims, 11 Drawing Sheets

SYSTEM AND METHOD FOR RECOMMENDING LOCATION-BASED KEYWORD

CROSS REFERENCE TO RELATED APPLICATION

This application claims priority from and the benefit of Korean Patent Application No. 10-2010-0103946, filed on Oct. 25, 2010, which is hereby incorporated by reference for all purposes as if fully set forth herein.

BACKGROUND OF THE INVENTION

1. Field of the Invention

Exemplary embodiments of the present invention relate to a location-based keyword recommending system and method which provide a recommended keyword in a search environment.

2. Discussion of the Background

With the development of information and communication technology, the Internet is readily accessible at almost any time and in any location. Accordingly, users are able to search for information without limitations, such as time and place, and are able to use desired contents and services.

In addition, as various mobile terminals, such as a mobile phone, a smart phone, and a personal digital assistant (PDA), are becoming more readily available through widespread information and communication technology, users of mobile searches are rapidly increasing.

In general search engines provide a keyword recommendation service for a convenient search for users. In the case of mobile searches, searched contents are likely to be related to a location to which a user belongs. However, the keyword recommendation system of the conventional search engines is incapable of recommending a keyword based on a location.

SUMMARY OF THE INVENTION

Exemplary embodiments of the present invention provide a location-based keyword recommending system and method to identify a location of a user and recommend a keyword frequently used in the location.

Exemplary embodiments of the present invention also provide a location-based keyword recommending system and method to set a virtual region, which may be a physical location, based on location information of recently-used keywords and to recommend a keyword used in a region corresponding to the virtual region for a user located in the virtual region.

Additional features of the invention will be set forth in the description which follows, and in part will be apparent from the description, or may be learned by practice of the invention.

Exemplary embodiments of the present invention disclose a non-transitory computer-readable medium including a keyword collecting unit, a region setting unit, and a keyword recommending unit. The keyword collecting unit stores a keyword and location information regarding a location where the keyword is received. The region setting unit sets a virtual region by performing clustering of the location information with reference to the received keyword. The keyword recommending unit to provide a recommended keyword. The recommended keyword is associated with the virtual region corresponding to the location where the keyword is received.

Exemplary embodiments of the present invention also disclose a location-based keyword recommendation method including storing location information regarding a location where a keyword is received, setting a virtual region by performing, using a processor, clustering of the location information with reference to the keyword, and providing a recommended keyword. The recommended keyword is associated with the virtual region corresponding to the location where the keyword is received.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
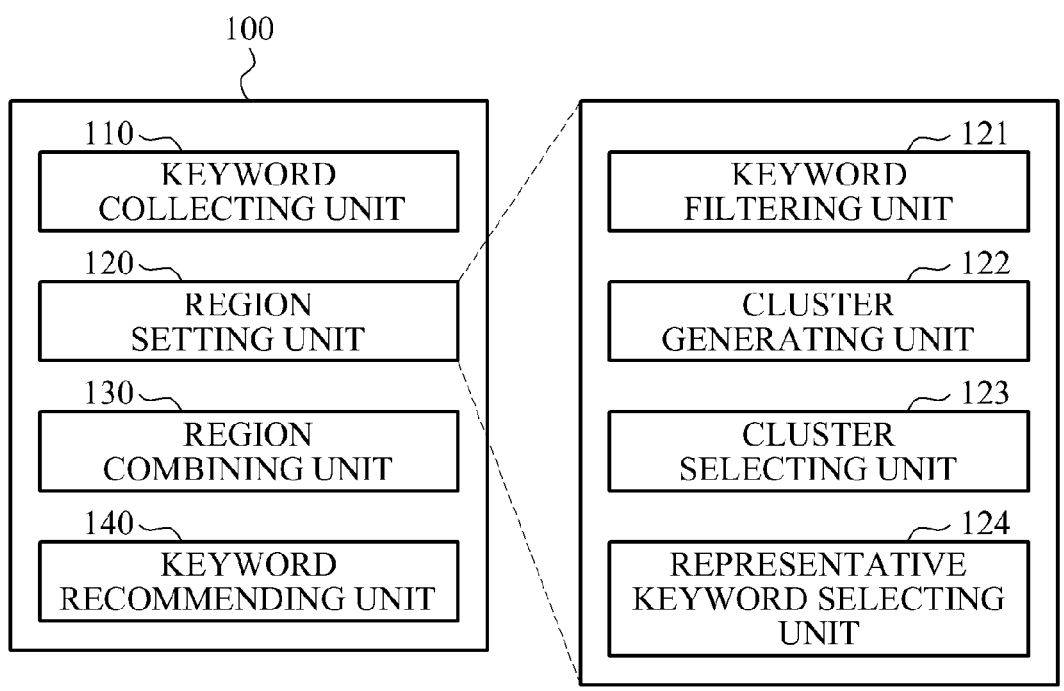
FIG. 1 is a block diagram illustrating an inner structure of a location-based keyword recommending system that recommends a keyword based on a location of a user, according to exemplary embodiments of the present invention.

Exemplary embodiments of the invention are described more fully hereinafter with reference to the accompanying drawings, in which exemplary embodiments of the invention are shown. This invention may, however, be embodied in many different forms and should not be construed as being limited to the exemplary embodiments set forth herein. Rather, exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Detailed descriptions of well-known functions and structures incorporated herein may be omitted to avoid obscuring the subject matter of the present invention.

It will be understood that, although the terms first, second, third etc. may be used herein to describe various elements, components, regions, layers and or sections, these elements, components, regions, layers and or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing exemplary embodiments only, and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It should be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning For example consistent with their meaning in the context of the relevant art and will not be interpreted in an idealized or overly formal sense unless expressly so defined herein.

Hereinafter, exemplary embodiments of the present invention are described in detail with reference to the accompanying drawings.

A location-based keyword recommending system described in the exemplary embodiments may be applied to a search engine system that provides a user with a search environment. In particular, the system may be applied to a search engine that provides a service recommending keywords recently at issue or keywords relevant to a keyword entered by the user for user convenience.

In the following description, a location-based keyword classifies a keyword recommended in relation to a regional location.

FIG. 1 is a block diagram illustrating an inner structure of a location-based keyword recommending system 100 according to exemplary embodiments of the present invention. The location-based keyword recommending system 100 may be adapted to recommend the location-based keyword based on a location of a user.

As shown in FIG. 1, the location-based keyword recommending system 100 may include a keyword collecting unit 110, a region setting unit 120, a region combining unit 130, and a keyword recommending unit 140.

The keyword collecting unit 110 may collect and store location information regarding a location where a keyword is used. A keyword entered by the user may be related to a location to which the user is associated with. For example, the location may be a location where the user lives, a location where the user shops, a location where the user studies, a location where the user eats, and, in general, any location that may be of interest to or associated with the user. Therefore, the keyword collecting unit 110 may collect keywords entered by the user and also collect information on a location where the user entered the keyword, for example, a location of a mobile terminal. The location information may indicate physical location information such as latitude and longitude. In some cases, the location information may refer to a virtual location combined with information tagged to a specific physical location such as a theater, a subway station, and the like.

The region setting unit 120 may set a virtual region by performing clustering of the location information with reference to the keywords. For example, when "gourmet restaurants around Gangnam station" is entered as a keyword, a range of regions around Gangnam station needs to be determined based on location information of the keyword entered. The region setting unit 120 may determine the virtual region by clustering the location information according to the entered keyword. The region setting unit 120 may reset the location-based keyword periodically, for example, every day, every week, or, in general, any suitable period. In a location where the virtual region cannot be generated based on the collected keywords, the virtual region may be set according to a default region, for example, an administrative district. It should be appreciated that Gangnam station is used hereinabove only as an example, and that any location/place may be entered by the user as a keyword.

The keyword recommending unit 140 may provide the user with a location-based keyword with respect to a virtual region corresponding to the location of the user, based on a keyword related to the virtual region. The keyword recommending unit 140 may recommend, to a user, a keyword frequently used in the corresponding region, using the keywords collected in the virtual region corresponding to the location of the user.

To achieve the aforementioned function, as shown in FIG. 1, the location-based keyword recommending system 100 may further include a region combining unit 130. In addition, the region setting unit 120 may include a keyword filtering unit 121, a cluster generating unit 122, a cluster selecting unit 123, and a representative keyword selecting unit 124.

The keyword filtering unit 121 may select, classify, or group the collected keywords to set the virtual region according to the collected keywords. The keyword filtering unit 121 may select, classify, or group the keywords collected for a specific time "t", for example, for the most recent 24 hours. The keyword filtering unit 121 may classify keywords similar to each other as one keyword. For example, similar keywords such as "Gangnam gourmet restaurants," "Gangnam restaurants," "Gangnam station gourmet restaurants," and "gourmet restaurants in Gangnam" may be classified as "Gangnam gourmet restaurants" based on data of conventional search engines. As another example, the keyword filtering unit 121 may group keywords similar to each other into one group. For instance, in contrast to denoting similar keywords as one keyword, the grouping method may generate a keyword group that covers all the similar keywords. For example, the keyword filtering unit 121 may select a keyword searched for or clicked on a predetermined number of times or more by different users for a predetermined time "t", among the collected keywords.

The cluster generating unit 122 may generate at least one cluster through clustering of the location information related to the keyword. The cluster generating unit 122 may consider latitude and longitude values which are the collected location information as coordinate values x and y, and may generate the cluster related to the location information by various clustering methods such as XMeans. For example, the cluster generating unit 122 may perform clustering of the location information for each denoted keyword or each keyword selected according to specific conditions. As another example, the cluster generating unit 122 may perform clustering of the location information related to keywords included in each keyword group.

The cluster selecting unit 123 may select a valid cluster by determining validity of the clusters generated in units of keywords or keyword groups. The cluster selecting unit 123 may select, as the valid cluster, a cluster satisfying both a number condition that requires a number of location information (hereinafter, referred to as "node") constituting the cluster to be not less than a predetermined number "n", and a standard deviation condition that requires a standard deviation with respect to the nodes in one cluster to not be greater than a predetermined value "s". In other words, the cluster selecting unit 123 may exclude a cluster of which the number of nodes is less than the predetermined number "n" or of which the standard deviation of the nodes is greater than the predetermined value "s".

Figure 2:
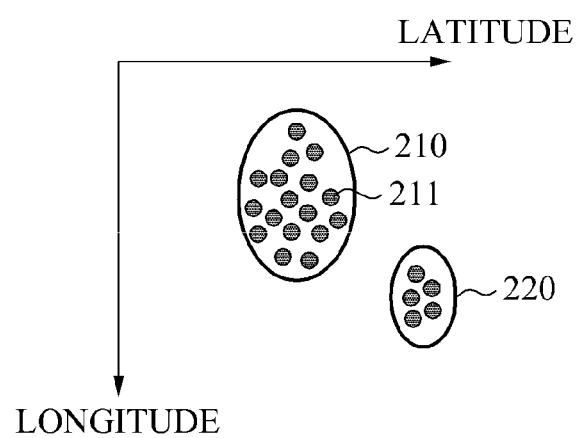
FIG. 2 is a diagram illustrating a process of clustering location information regarding a location where a keyword is used, to set a virtual region for recommendation of the keyword, according to exemplary embodiments of the present invention.

In FIG. 2, two clusters 210 and 220 may be generated as a result of clustering related to a keyword, for example, "Gangnam weather." The two clusters 210 and 220 may satisfy a standard deviation condition. For instance, the cluster 210 may satisfy a number condition regarding a number of nodes 211, but the cluster 220 may not satisfy the number condition, and therefore, the cluster 220 may be excluded whereas the cluster 210 may be selected as the valid cluster.

When a valid cluster is found as a result of clustering performed for each keyword, the representative keyword selecting unit 124 may select a corresponding keyword as a representative location keyword with respect to the valid cluster. When there is no valid cluster with respect to a certain keyword, the keyword may not be selected as the representative location keyword. When a valid cluster exists with respect to a certain keyword, the valid cluster may be selected as the representative location keyword. For example, when the keyword is "weather", which may generally be used in a wide location, the standard deviation of the nodes may be high. Therefore, the keyword "weather" has a low chance of being selected as the representative location keyword. In contrast, if the keyword is, for example, "Gangnam weather", the possibility is relatively high that there is a cluster satisfying both the number condition and the standard deviation condition since the keyword may likely be used in a limited location of "Gangnam" although, clusters having a high standard deviation or a deficient number of nodes may partially exist. Therefore, the keyword "Gangnam weather" has a high chance of being selected as the representative location keyword. It should be appreciated that Gangnam is used hereinabove only as an example, and that any location/place may be entered by the user as a keyword.

According to the above-described structure, the region setting unit 120 may set the virtual region using the valid cluster from which the representative location keyword is selected. The process of determining the virtual region will be described with reference to FIGS. 3, 4, 5 and 6.

Figure 3:
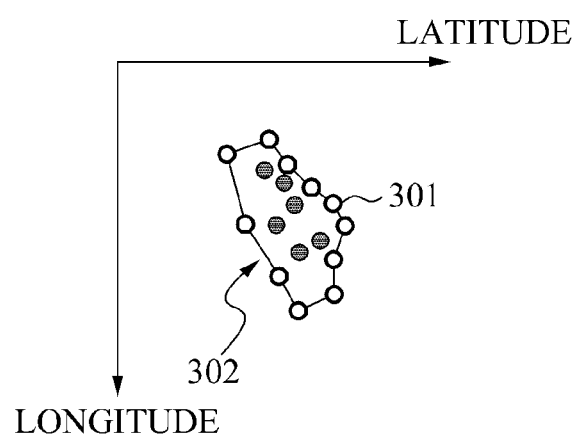
FIG. 3, FIG. 4, FIG. 5 and FIG. 6 are diagrams illustrating a process of determining a virtual region using clusters related to location information, according to exemplary embodiments of the present invention.
Figure 4:
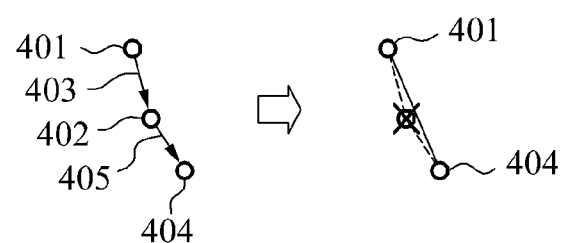
Figure 5:
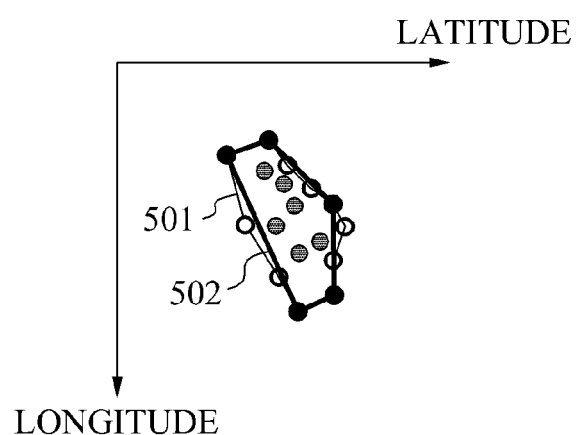
Figure 6:
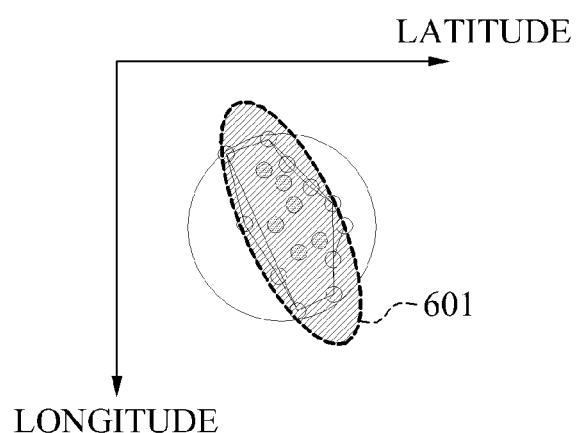

FIG. 3, FIG. 4, FIG. 5 and FIG. 6 are diagrams illustrating a process of determining a virtual region using clusters related to location information, according to exemplary embodiments of the present invention. As shown in FIG. 3, the region setting unit 120 may detect, from the valid cluster, peripheral nodes 301, and then set the virtual region using a polygonal region 302 formed by connecting the peripheral nodes. The region setting unit 120 may generate the polygonal region 302 to connect the peripheral nodes 301 using the Graham algorithm. For example, the region setting unit 120 may simplify the polygonal region by selectively excluding some of the peripheral nodes. For example, as shown in FIG. 4, an angle between a vector 403 connecting a node 401 and a node 402 and a vector 405 connecting the node 402 and a node 404 may be obtained by calculating a scalar product of the vectors 403 and 405. When the angle is less than about 5 degrees, the node 402 disposed in the middle may be excluded while directly connecting the node 401 and the node 404 with each other. As shown in FIG. 5, a polygonal region 501 connecting all the peripheral nodes in the cluster may be transformed into a simplified polygonal region 502 by excluding some of the peripheral nodes. The simplified polygonal region 502 may be determined to be the virtual region. In some cases, the region setting unit 120 may simplify the polygonal region connecting the peripheral nodes, using a circle or an oval circumscribing the polygonal region. For example, as shown in FIG. 6, a circle or oval 601 may be formed to circumscribe the polygonal region connecting all the peripheral nodes. When a tolerance with respect to an area of the polygonal region is less than about 10%, the circle or oval 601, instead of the polygonal region, may be determined to be the virtual region. A circle may generate a greater position tolerance or area tolerance than an oval. However, since an oval generally causes an area tolerance of less than about 10% with respect to the polygonal region, the oval may be determined to be the virtual region. Accordingly, the region setting unit 120 may set the polygonal region formed using the valid cluster, as the virtual region, and may set a representative location keyword related to the valid cluster as the representative location keyword of the virtual region.

According to the above structure, the region combining unit 130 may combine virtual regions overlapping each other into one virtual region. For example, when two virtual regions in which the representative location keyword is selected overlap by a predetermined area "a" or when one virtual region wholly belongs to another virtual region, the two virtual regions may be combined. As another example, when a combined area of two virtual regions may be less than a predetermined area "b", the region combining unit 130 may combine the two virtual regions.

Figure 7:
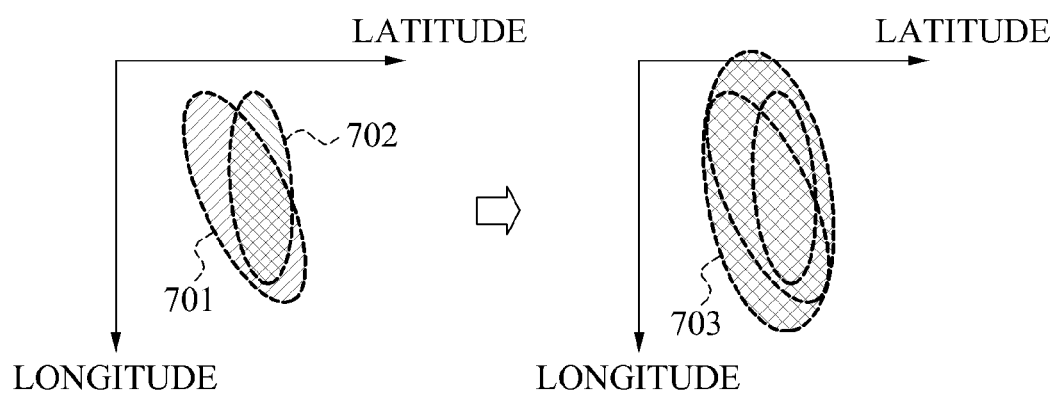
FIG. 7 is a diagram illustrating a process of combining virtual regions, according to exemplary embodiments of the present invention.

As shown in FIG. 7, a virtual region 701, from which "Gangnam weather" is selected as the representative location keyword, may overlap a virtual region 702 from which "Gangnam gourmet restaurant" is selected as the representative location keyword, by 90% or more, and when a combined area of the virtual region 701 and the virtual region 702 is less than about 10 km², a virtual region 703 covering both virtual regions 701 and 702 may be set as a new virtual region. Therefore, with respect to the new virtual region, relevant keywords may be set to include "Gangnam weather" and "Gangnam gourmet restaurant." As yet another example, when certain virtual regions have the same representative location keyword or the same relevant keyword, the region combining unit 130 may combine the virtual regions so that the virtual regions are considered the same region.

Figure 8:
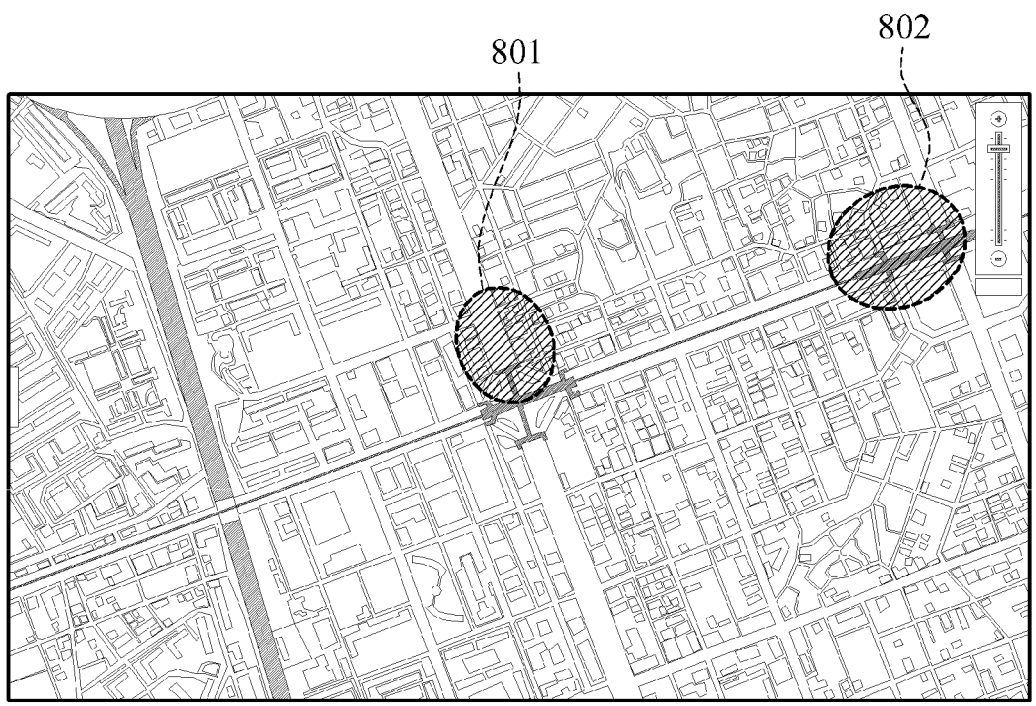
FIG. 8 is a diagram illustrating an example virtual region set based on location information regarding a location where a keyword is used, according to exemplary embodiments of the present invention.

As shown in FIG. 8, a virtual region 801 and a virtual region 802 are in different physical locations, but have the same representative location keyword, or at least one relevant keyword that is the same. In this case, the virtual regions 801 and 802 may be processed as the same region.

Figure 9:
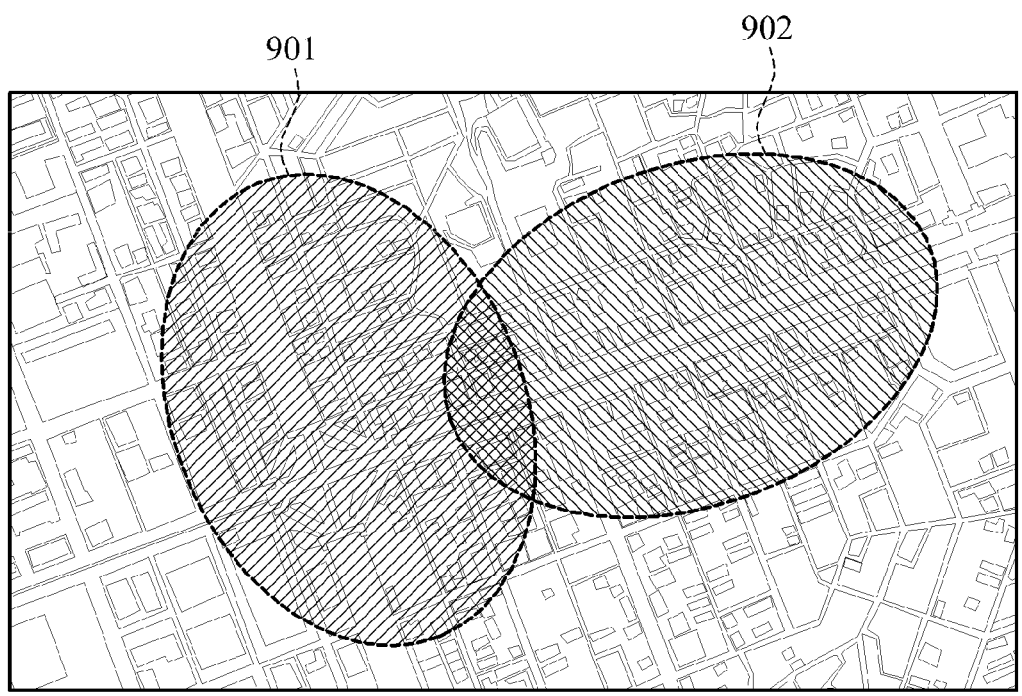
FIG. 9 is a diagram illustrating a process of combining virtual regions based on a representative location keyword with respect to the virtual regions, according to exemplary embodiments of the present invention.

Using the combining process, the region setting unit 120 may thus set a virtual region 901 and a virtual region 902 formed by clustering of the physical locations, as shown in FIG. 9. The relevant keywords may include the representative location keyword and may also include all keywords containing the location information within the virtual region. In addition, the relevant keywords may further include keywords rapidly increasing in frequency of use in the virtual region related to time information, such as a popular keyword.

According to the foregoing structure, the keyword recommending unit 140 of FIG. 1 may recognize information on the location of the user prior to searching, and recommend relevant keywords of the virtual region corresponding to the recognized location for the user. The keyword recommending unit 140 may select a location-based keyword recommending system to be recommended, using a recommended keyword logic of the conventional search engines, based on the relevant keywords. For example, the keyword recommending unit 140 of FIG. 1 may provide, as the location-based keyword, a keyword among the relevant keywords of the virtual region, which may be searched or clicked a predetermined number of times or more by another user before a keyword is entered by the user. When there is the location information before the user entered a keyword, a keyword frequently used in the corresponding virtual region may be recommended in advance. As another example, when a keyword is entered by the user, the keyword recommending unit 140 of FIG. 1 may provide a keyword corresponding to a category of the entered keyword among the relevant keywords of the virtual region where the user is located. As yet another example, when the user is located in one virtual region, the keyword recommending unit 140 of FIG. 1 may provide the location-based keyword based on the relevant keywords of the virtual region. In addition, when the user is located in a region including at least two overlapping virtual regions, the keyword recommending unit 140 may select the location-based keyword in consideration of the relevant keywords of the at least two virtual regions. In this case, the keyword recommending unit 140 may select the keyword corresponding to the category of the entered keyword as the location-based keyword, among the relevant keywords of the at least two virtual regions. Also, the keyword recommending unit 140 may select the location-based keyword using feedback information related to a keyword recommended to another user in the region including the overlapping virtual regions.

Figure 10:
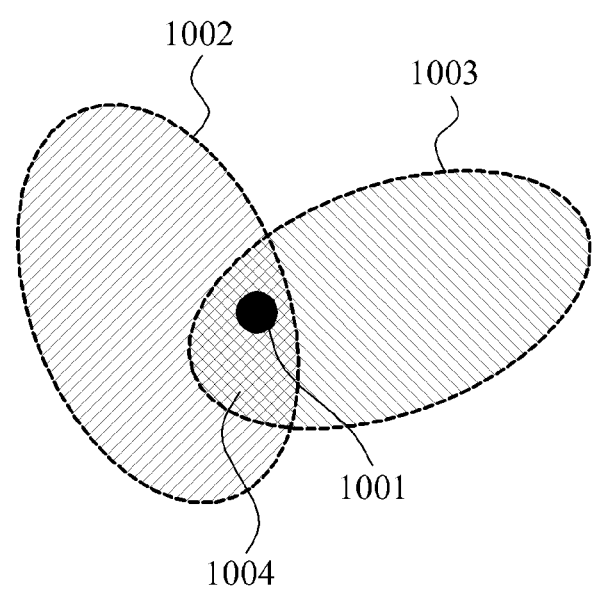
FIG. 10 is a diagram illustrating a process of selecting a location-based keyword to be recommended for a user, based on a location of the user, according to exemplary embodiments of the present invention.

Referring to FIG. 10, when a user 1001 is located in an overlapping region 1004 where a virtual region A 1002 and a virtual region B 1003 overlap, the keyword recommending unit 140 of FIG. 1 may collect keywords actually clicked by another user (hereinafter, referred to as "clicked keyword") among the keywords recommended to another user in the overlapping region 1004. Next, the keyword recommending unit 140 may calculate weights of the virtual region A 1002 and the virtual region B 1003, using similarity between the relevant keywords of the virtual region A 1002 and the virtual region B 1003. For example, when the clicked keywords are "Gangnam," "Gangnam gourmet restaurants," "Gangnam bus," "weather," and "Yeoksam bar," when the relevant keywords of the virtual region A 1002 are "Gangnam," "Gangnam weather," "Gangnam gourmet restaurants," and "Gangnam events," and when the relevant keywords of the virtual region B 1003 are "Yeoksam," "Yeoksam bar," and "Gangnam tower," similarity with the clicked keywords is higher in the virtual region A 1002 than in the virtual region B 1003. Therefore, the weight of the virtual region A 1002 is set to be higher than the weight of the virtual region B 1003. Accordingly, when the user is located in the region including at least two virtual regions, the keyword recommending unit 140 may provide the location-based keyword based on the relevant keywords of a high-weight virtual region.

Figure 11:
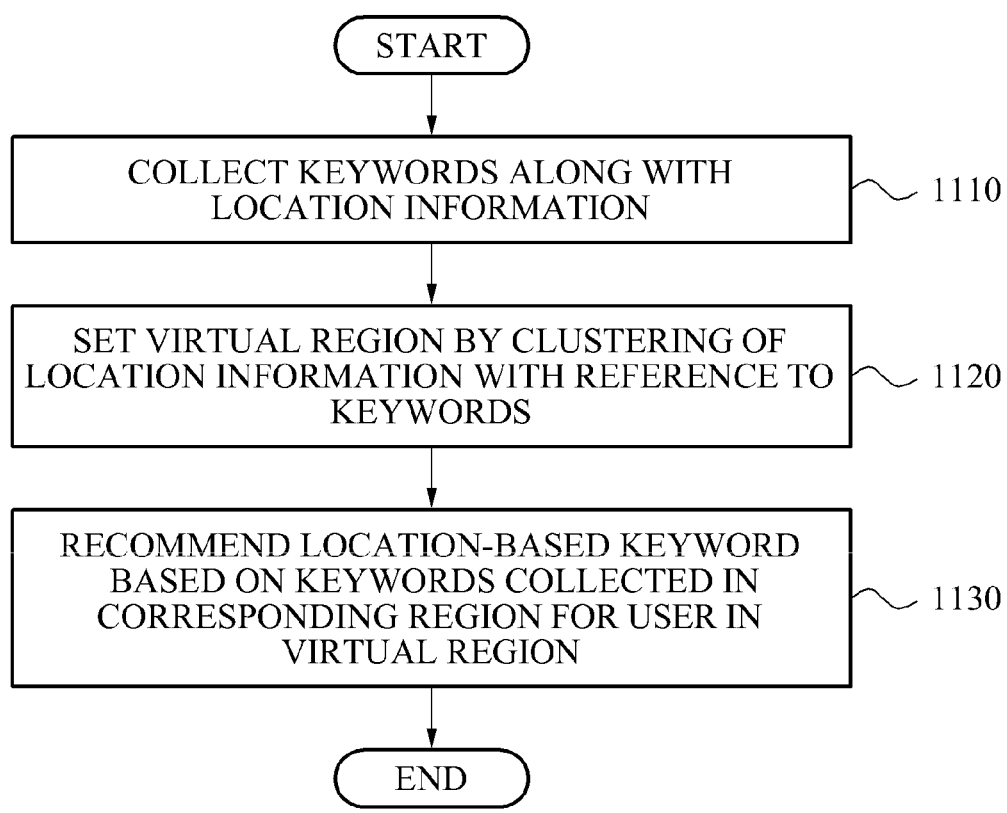
FIG. 11 is a flowchart illustrating a location-based keyword recommending method to recommend a location-based keyword based on a location of a user, according to exemplary embodiments of the present invention.

FIG. 11 is a flowchart illustrating a location-based keyword recommending method to recommend a location-based keyword based on a location of a user, according to exemplary embodiments of the present invention. Respective operations of the location-based keyword recommending method may be performed by the location-based keyword recommending system 100 of FIG. 1.

In operation 1110, the location-based keyword recommending system 100 may collect location information regarding a location where a keyword is used. For example, the location-based keyword recommending system 100 may collect keywords entered by the user of a mobile terminal and collect location information corresponding to the location where the user entered the keyword. The location information may indicate physical location information such as latitude and longitude. In some cases, the location information may refer to a virtual location combined with information tagged to a specific physical location such as, for example, a theater or a subway.

In operation 1120, the location-based keyword recommending system 100 may perform clustering of the location information with reference to the keyword, thereby setting the virtual region. First, by using the collected keywords, the location-based keyword recommending system 100 may classify keywords similar to each other as one keyword, group keywords similar to each other into one group, or may select keywords searched or clicked at least a predetermined number of times by other users for a predetermined time "t". Next, the location-based keyword recommending system 100 may generate at least one cluster by clustering the location information related to a keyword, for each denoted keyword or each keyword selected according to specific conditions, or by clustering the location information related to keywords included in a keyword group. Also, among the clusters generated in units of keyword or keyword group, the location-based keyword recommending system 100 may select, as a valid cluster, a cluster satisfying both a number condition that requires a minimum number (e.g., a predetermined number "n") of nodes to be present in the cluster and/or a standard deviation condition that requires a standard deviation with respect to the nodes in the cluster to be less than or equal to a predetermined value. The virtual region may then be set using the valid cluster.

In operation 1130, the location-based keyword recommending system 100 may provide a location-based keyword to the user based on relevant keywords of the virtual region corresponding to the location of the user. The relevant keywords may include any or all keywords containing the location information within the virtual region. In addition, the relevant keywords may further include keywords rapidly increasing in frequency of use in the virtual region related to time information. When the user is located in one virtual region, the location-based keyword recommending system 100 may provide the relevant keywords of the corresponding virtual region as the location-based keyword. When the user is located in a region including at least two overlapping virtual regions, the location-based keyword recommending system 100 may select the location-based keyword considering the relevant keywords of the at least two virtual regions. In this case, the keyword recommending unit 140 may select the keyword corresponding to the category of the entered keyword as the location-based keyword, among the relevant keywords of the at least two virtual regions. Additionally, the location-based keyword recommending system 100 may select the location-based keyword using feedback information related to a keyword recommended to another user in the overlapping region.

Thus, according to the foregoing exemplary embodiments of the present invention, a location-based keyword recommending service is achieved by identifying a location of a user and recommending a keyword frequently-used in the location.

The above-described exemplary embodiments of the present invention may be recorded in non-transitory computer-readable media including program instructions to implement various operations embodied by a computer. The media may also include, alone or in combination with the program instructions, data files, and data structures. The program instructions recorded on the media may be those specially designed and constructed for the purposes of the exemplary embodiments of the invention, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), and/or flash memory. Examples of program instructions include both machine code, such as produced by a compiler, and files containing higher level code that may be executed by the computer using an interpreter.

For example, it should be appreciated that, in some cases, the location-based keyword recommending system 100 may be implemented as a computer system comprising a processor, an input/output, a storage medium, and any other suitable components. The components, such as the processor, may be configured to execute instructions corresponding to the method described in FIG. 11. The computer system may include a keyword collecting unit 110, a region setting unit 120, a region combining unit 130, and a keyword recommending unit 140. The computer system may be a computer, a portable electronic device (e.g., mobile phone, navigation device), or in general, any suitable electronic device. The computer system may be connected to an internal or external network, such as, for example, the Internet or any data network. The computer system may also include or be connected to any suitable location acquiring system, such as a Global Positioning System (GPS), to acquire a location of the computer system or a location input by the user of the computer system. The computer system may also include an input/output unit to receive input or keywords from the user and to display any suitable data, such as the recommended keyword, to the user. In general, the computer system may include any suitable input/output unit such as, for example a touch-based or motion-based graphical or non-graphic interface, a mouse, and/or a keyboard. The computer system may also include a storage medium to store information collected such as, for example, location information and keywords. The processor may control all components of the computer system to implement the exemplary embodiments of the invention as described hereinabove.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A non-transitory computer-readable medium having computer readable instructions stored thereon, which when executed configure at least one processor to:
   store input keywords and location information of terminals where the input keywords are entered;
   generate a virtual region using clustering of the location information by connecting a number of peripheral nodes corresponding to the location information; and
   provide, in response to receipt of location information corresponding to the virtual region, a recommended keyword, the recommended keyword being associated with the virtual region corresponding to the location information, the recommended keyword being a location-based search keyword that is determined to be relevant to the virtual region based on other relevant keywords associated with the virtual region.

2. The non-transitory computer-readable medium of claim 1, wherein the at least one processor is further configured to:
   classify related keywords of the input keywords as a first keyword; and
   perform clustering of the location information related to the first keyword.

3. The non-transitory computer-readable medium of claim 2, wherein the at least one processor is further configured to:
   group related keywords; and
   perform clustering of the location information of the related keywords in each group.

4. The non-transitory computer-readable medium of claim 1, wherein the at least one processor is further configured to:
   determine at least one cluster by performing clustering of the location information according to the input keywords, and to generate the virtual region using the at least one cluster.

5. The non-transitory computer-readable medium of claim 4, wherein the at least one processor is further configured to:
   select a valid cluster by determining validity of the at least one cluster, and to generate the virtual region using the valid cluster.

6. The non-transitory computer-readable medium of claim 5, wherein the at least one processor is further configured to select a cluster comprising a number of nodes corresponding to the location information as the valid cluster, or to select a cluster using a standard deviation with respect to the node corresponding to the location information as the valid cluster.

7. The non-transitory computer-readable medium of claim 4, wherein the at least one processor is further configured to detect one or more of the peripheral nodes corresponding to the location information included in the at least one cluster, and to generate a polygonal region formed by connecting the one or more of the peripheral nodes.

8. The non-transitory computer-readable medium of claim 7, wherein the at least one processor is further configured to generate a circular region or an oval region circumscribing the polygonal region or the generate a simplified polygonal region by excluding at least one of the peripheral nodes.

9. The non-transitory computer-readable medium of claim 4, wherein the at least one processor is further configured to:
   select a keyword related to the at least one cluster as a representative location keyword; and combine a plurality of the virtual regions comprising the same representative location keyword into one virtual region.

10. The non-transitory computer-readable medium of claim 9, wherein the at least one processor is further configured to:
select a keyword related to the at least one cluster as a representative location keyword; and
to provide the representative location keyword as the recommended keyword corresponding to the virtual region.

11. The non-transitory computer-readable medium of claim 10, wherein the at least one processor is further configured to provide the recommended keyword corresponding to a category comprising the input keywords received from the terminals.

12. The non-transitory computer-readable medium of claim 1, wherein the at least one processor is further configured to combine the virtual region comprising a plurality of overlapping regions into one virtual region.

13. The non-transitory computer-readable medium of claim 1, wherein the at least one processor is further configured to select the recommended keyword from the input keywords related to the location information of the virtual region according to a number of searches or clicks related to the keyword.

14. The non-transitory computer-readable medium of claim 1, wherein the at least one processor is further configured to provide the recommended keyword prior to receiving an input keyword.

15. The non-transitory computer-readable medium of claim 1, wherein the at least one processor is further configured to select the recommended keyword based on a number of clicks associated with a plurality of input keywords or to select the recommended keyword corresponding to the category comprising the keyword received from a terminal when the terminal is detected in a region where at least two virtual regions overlap.

16. A method that uses at least one processor to provide location-based keyword recommendation method, the method comprising:
storing, using at least one processor, location information of terminals where input keywords are entered;
generating, using the at least one processor, a virtual region using clustering of the location information by connecting a number of peripheral nodes corresponding to the location information; and
upon receipt of location information corresponding to the virtual region, providing, using the at least one processor, a recommended keyword, the recommended keyword being associated with the virtual region corresponding to the location information, the recommended keyword being a location-based search keyword that is determined to be relevant to the virtual region based on other relevant keywords associated with the virtual region.

17. The method of claim 16, further comprising:
classifying, using the at least one processor, related input keywords as a first keyword; and
performing, using the at least one processor, clustering of the location information related to the first keyword.

18. The method of claim 16, further comprising:
grouping, using the at least one processor, related keywords, and
performing, using the at least one processor, clustering of the location information of the related keywords in each group.

19. The method of claim 16, further comprising:
determining, using the at least one processor, at least one cluster by performing clustering of the location information according to the input keywords, and generating the virtual region using the at least one cluster.

20. The method of claim 19, further comprising:
selecting, using the at least one processor, a valid cluster by determining validity of the at least one cluster, and
generating, using the at least one processor, the virtual region using the valid cluster.

21. The method of claim 20, wherein the selecting of the valid cluster comprises selecting a cluster comprising a number of nodes corresponding to the location information as the valid cluster, or selecting a cluster using a standard deviation with respect to the node corresponding to the location information as the valid cluster.

22. The method of claim 19, further comprising:
detecting, using the at least one processor, one or more peripheral nodes out of the number of peripheral nodes corresponding to the location information of at least one cluster, and
generating, using the at least one processor, a polygonal region formed by virtually connecting the peripheral nodes.

23. The method of claim 22, further comprising:
generating, using the at least one processor, a circular region or an oval region circumscribing the polygonal region or generating a simplified polygonal region by excluding at least one of the peripheral nodes to generate the virtual region.

24. The method of claim 19, further comprising:
selecting, using the at least one processor, a keyword related to the at least one cluster as a representative location keyword, and
combining, using the at least one processor, a plurality of the virtual regions comprising the same representative location keyword into one virtual region.

25. The method of claim 19, further comprising:
selecting, using the at least one processor, a keyword related to the at least one cluster as a representative location keyword, and
providing, using the at least one processor, the representative location keyword as the recommended keyword corresponding to the virtual region.

26. The method of claim 16, further comprising:
combining, using the at least one processor, the virtual region comprising a plurality of overlapping regions into one virtual region.

27. The method of claim 16, further comprising:
selecting, using the at least one processor, the recommended keyword from the input keywords related to the location information of the virtual region according to a number of searches or clicks related to the keyword.

28. The method of claim 16, further comprising:
providing, using the at least one processor, the recommended keyword prior to receiving an input keyword.

29. The method of claim 16, further comprising:
providing, using the at least one processor, the recommended keyword corresponding to a category comprising the input keywords received from the terminals.

30. The method of claim 16, further comprising:
selecting, using the at least one processor, the recommended keyword based on a number of clicks associated with a plurality of keywords received from the terminals or selecting the recommended keyword corresponding to the category comprising the keyword received from the terminals when terminals are detected in a region where at least two virtual regions overlap.

31. A non-transitory computer-readable recording medium comprising an executable program, which when executed by at least one processor, configures the at least one processor to performs a method, the method comprising:

storing location information of terminals where input keywords are entered:

generating a virtual region using clustering of the location information by connecting a number of peripheral nodes corresponding to the location information; and upon receipt of location information corresponding to the virtual region, providing a recommended keyword, the recommended keyword being associated with the virtual region corresponding to the location information, the recommended keyword being a location-based search keyword that is determined to be relevant to the virtual region based on other relevant keywords associated with the virtual region.

* * * * *